United States Patent [19]

Ahmed

[11] Patent Number: 5,049,351
[45] Date of Patent: Sep. 17, 1991

[54] METHOD AND APPARATUS FOR DETERMINING ENRICHMENT OF URANIUM DIOXIDE POWDER

[75] Inventor: Hassan J. Ahmed, Irmo, S.C.

[73] Assignee: Westinghouse Electric Corp., Pittsburgh, Pa.

[21] Appl. No.: 375,233

[22] Filed: Jul. 3, 1989

[51] Int. Cl.$^5$ ............................................. G21C 17/00
[52] U.S. Cl. ..................................... 376/257; 264/0.5; 250/308
[58] Field of Search ................ 376/257, 245; 250/308, 250/370.11, 255, 336.1, 358.1, 359.1; 264/0.5

[56] References Cited

U.S. PATENT DOCUMENTS

| | | | |
|---|---|---|---|
| 3,188,469 | 6/1965 | Eukel | 250/83 |
| 3,736,429 | 5/1973 | Foley | 250/71.5 R |
| 4,229,654 | 10/1980 | Arya et al. | 250/358 R |
| 4,291,227 | 9/1981 | Caldwell et al. | 250/328 |
| 4,374,326 | 2/1983 | Wykes | 250/255 |
| 4,497,768 | 2/1985 | Caldwell et al. | 376/153 |
| 4,515,749 | 5/1985 | Schoenig, Jr. et al. | 376/254 |
| 4,620,100 | 10/1986 | Schoenig, Jr. et al. | 250/358.1 |
| 4,629,600 | 12/1986 | Ishiguro et al. | 376/257 |
| 4,687,605 | 8/1987 | Cellier et al. | 264/0.5 |

FOREIGN PATENT DOCUMENTS 0174791  10/1984  Japan ................................... 376/257

Primary Examiner—Brooks H. Hunt
Assistant Examiner—Chrisman D. Carroll

[57] ABSTRACT

A method and apparatus for determining the enrichment of uranium dioxide powder is disclosed. A uranium dioxide powder is contained within a closed receptacle having a top, side and bottom wall surfaces. The receptacle is turned upside down so that the uranium dioxide powder is shifted within the receptacle to obtain a more uniform bulk density of the powder contained therein. The natural gamma radiation emission count of the powder is detected while the receptacle is upside down to determine the enrichment thereof.

10 Claims, 2 Drawing Sheets

METHOD AND APPARATUS FOR DETERMINING ENRICHMENT OF URANIUM DIOXIDE POWDER

FIELD OF THE INVENTION

This invention relates to a method and apparatus for determining the enrichment of uranium dioxide powder and more particularly to a method and apparatus for determining the enrichment of uranium dioxide powder by detecting the natural radiation count of the powder and determining the enrichment thereof.

Background of the Invention

Commercial uranium nuclear fuel material is stored as uranium dioxide ($UO_2$) powder derived from gaseous uranium hexaflouride ($UF_6$). This powder is processed from a natural uranium having an enrichment factor of approximately 0.7% which corresponds to the percentage of highly fissionable $U^{235}$ isotope. After processing to enrich the $U^{235}$ isotope content, the uranium dioxide powder has a $U^{235}$ enrichment factor ranging from three to five percent. The powder is further processed and pelletized for insertion within zirconium fuel rods. The completed fuel rods then are scanned in accordance with conventional methodology to assure that all pellets are of uniform enrichment.

During processing of the uranium fuel material, it is desirable to determine the enrichment of the uranium dioxide powder to assure a better quality control. Processing of non-uniformly enriched uranium dioxide powder is expensive and time consuming and results in the manufacture of non-uniformly enriched fuel pellets. Heretofore, methodology utilizing hardware similar to that used in detecting uranium ore samples primarily has been used to determine the enrichment of uranium dioxide powder. Typically, large amounts of loose powder are passively scanned to determine the 186 Kev gamma radiation emission count. Based upon the detected count, an estimated enrichment value is calculated. However, the calculated enrichment values sometimes are inaccurate for several reasons. The uranium dioxide powder is self-shielding to the emitted gamma radiation. Because the amount of self-shielding is dependent upon the bulk density of the powder the amount of absorbed radiation varies from one storage receptacle to another. The powder can be stratified in different layers having varied bulk densities, or the powder can be more or less dense between different receptacles. Thus, error not only can exist in one sample, but also exist between different samples having a varying bulk density.

Additionally, the fuel aging effect of uranium dioxide powder possibly can affect enrichment measurement. In fuel aging, $U^{238}$ emits an alpha particle and changes to $Pa^{234}$ which emits high energy gamma radiation. The aging phenomenon must be taken into account because the gamma energy spectrum is shifted up and down depending on the lapsed time since conversion.

It is therefore an object of this invention to provide a method and apparatus for determining the enrichment of uranium dioxide powder which provides a more uniform bulk density of the powder to minimize the error associated in determining enrichment.

It is another object of this invention to provide a method and apparatus for determining the enrichment of uranium dioxide powder which minimizes the error associated with fuel aging.

SUMMARY OF THE INVENTION

In accordance with the present invention, there is provided a method and apparatus for determining the enrichment of uranium dioxide powder. A uranium dioxide powder is contained within a closed receptacle having top, bottom and side wall surfaces. The receptacle is turned upside down so that the uranium dioxide powder is shifted within the receptacle to obtain a more uniform bulk density of the powder contained therein. The natural gamma radiation emission count of the powder is detected and a microprocessor generates a spectrum of the 186 Kev natural gamma radiation count and measures the peak of that generated spectrum to determine the enrichment of the powder.

In the preferred embodiment, roller conveyor means are provided for advancing the receptacle along a linear path of travel. An open-ended box structure is positioned along the path of travel to receive therein the receptacle advancing along the roller conveyor means. The box structure has a bottom wall surface resting on the roller conveyor means, a top wall surface and two opposing side wall surfaces connecting top and bottom wall surfaces so that the open ends of the box structure form an opening along the path of travel to receive a receptacle therein. Hinge means interconnect the box structure and roller conveyor means for allowing the box structure to be pivoted in a substantially circular path around the hinge means so that the top wall surface of the box structure becomes the bottom wall surface and visa versa wherein upon pivoting of the receptacle the uranium dioxide powder contained within the receptacle is shifted within the receptacle to obtain a more uniform air bulk density of the powder contained therein. Also, the invention effectively eliminates the container fill level effect on the measurement.

BRIEF DESCRIPTION OF THE DRAWINGS

Some of the objects and advantages of the present invention having been stated, others will be more fully understood from the detailed description which follows and by reference to the accompanying drawings in which.

DETAILED DESCRIPTION OF THE PREFERRED EMBODIMENT

Figure 1:
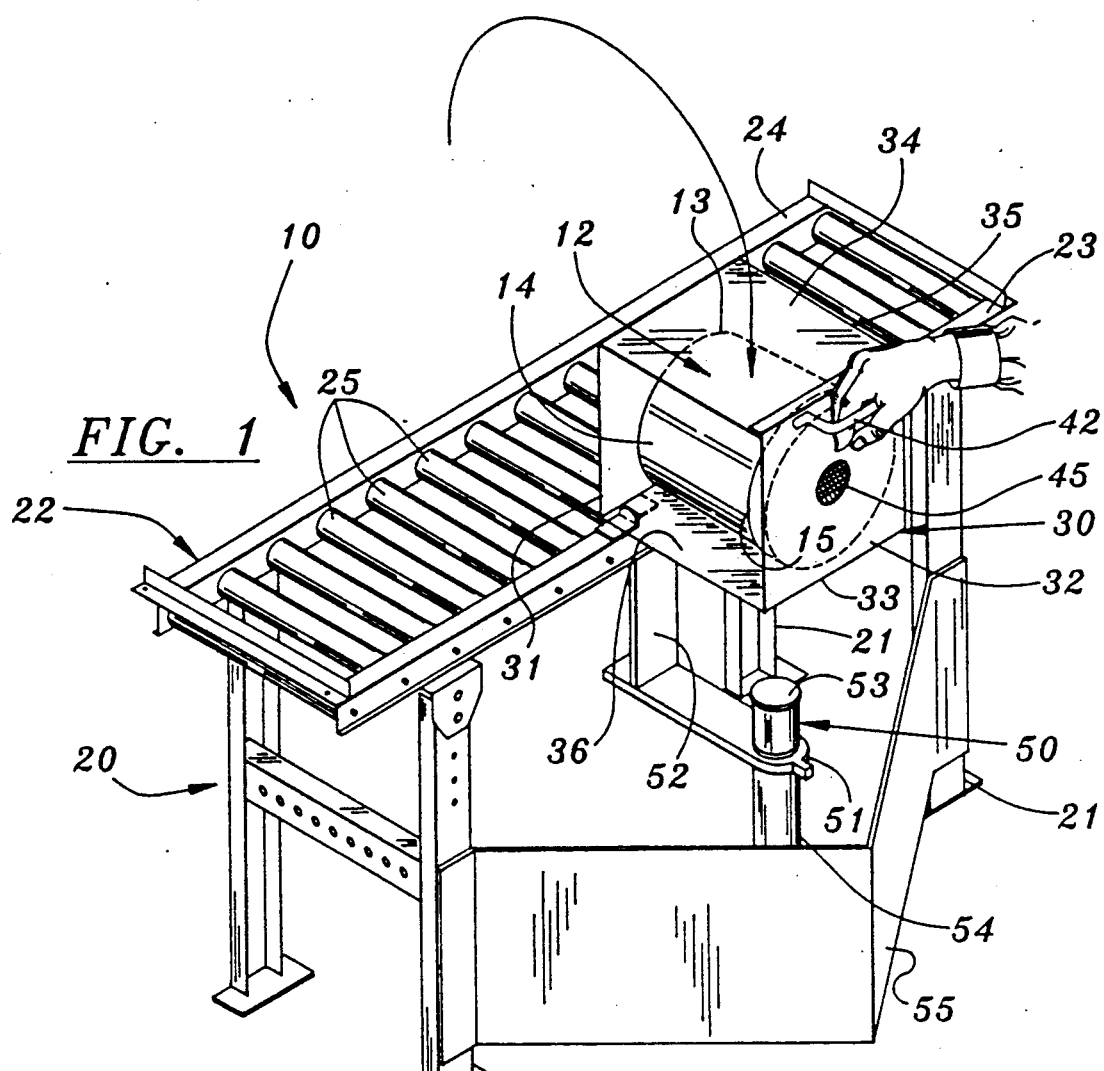
FIG. 1 is an isometric view of the apparatus showing the receptacle having uranium dioxide powder contained therein being turned upside down.
Figure 2:
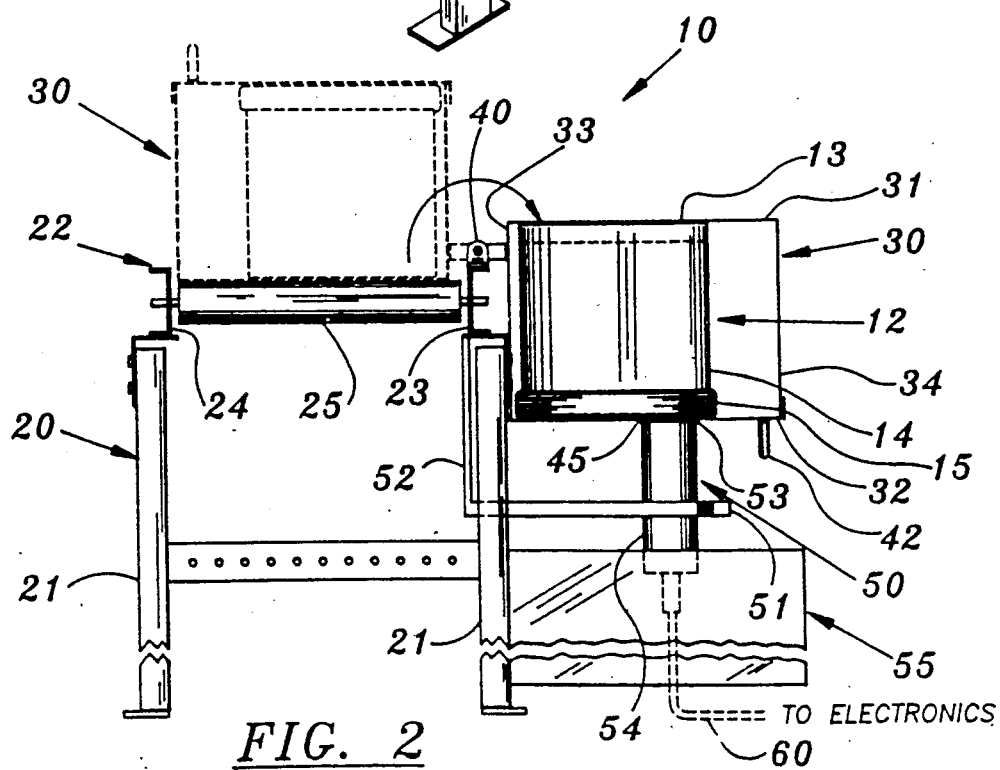
FIG. 2 is a sectional view of the apparatus showing the receptacle turned upside down and positioned against the scintillator.

Referring now to the drawings, and more particularly to FIGS. 1 and 2, the preferred embodiment of the apparatus for determining the enrichment of uranium dioxide powder in accordance with present invention is generally indicated by reference numeral 10. As illustrated, uranium dioxide powder is contained within a receptacle 12 conventionally referred to as a "polypak" As is conventional, the receptacle 12 is formed from rigid high density polyethylene and is cylindrically shaped. The receptacle 12 is approximately ten inches in diameter and has a main body portion formed from a round bottom wall surface 13 interconnecting a cylindrically shaped side wall surface 14. A covering cap 15 engages the main body portion in an air tight seal thereat. Although not illustrated in detail, the bottom of the "poly-pak" receptacle 12 includes ribbed portions thereat to reinforce the receptacle and prevent damage during handling. The covering cap. 15 engaging the main body portion is substantially flat and also formed of rigid high density polyethylene.

Uranium dioxide powder is contained within the receptacle 12. The uranium dioxide powder is derived from gaseous uranium hexaflouride ($UF_6$). After processing to enrich the $U^{235}$ isotope content, the uranium typically has a $U^{235}$ enrichment factor ranging from three to five percent. This powder is loosely placed within the receptacle 12 so that the receptacle is approximately ¾ to ⅞ full. Preferably the receptacle 12 is not filled completely to capacity with the uranium dioxide powder because the powder could more easily pack, leading to stratification and variation in the bulk density of the powder. As will be explained in detail later, the apparatus 10 in accordance with the present invention creates a more uniform air bulk density of the powder to allow more accurate measurement and calculation of the enrichment value of the powder.

As illustrated, the apparatus includes a frame 20 adapted for placement on a work floor. The frame 20 is fabricated from four rigid aluminum struts 21 and supports thereon a roller conveyer 22 formed from two spaced apart parallel support tracks 23, 24 mounted on the frame struts 21. A plurality of rollers 25 are positioned between the tracks 23, 24 and rotatably connected thereto for advancing the receptacle 11 along a linear path of travel in transverse direction to the rollers 25.

An open-ended box structure 30, adapted to receive the receptacle 12 therein, is pivotably connected to the roller conveyor 22 along the support track 23. The box structure 30 is fabricated from sheet metal, and includes a bottom wall surface 31 which rests on the roller conveyor 22 when the box structure is positioned in its upright configuration as shown in dashed lines in FIG. 2. The bottom wall surface 31 extends transversely across the conveyer and rests upon approximately four rollers 25. The box structure 30 also includes a top wall surface 32 and two opposing side wall surfaces 33, 34 extending longitudinally with the conveyor 22 and connecting the top and bottom wall surfaces 31, 32 to form the open-ended box structure 30, with the open ends 35, 36 facing along the roller conveyor 22 path of travel to receive the receptacle 12 advancing therealong. As best seen in FIG. 2, the top and bottom wall surfaces 31, 32 are spaced a distance from each other to allow for insertion of the receptacle between both wall surfaces 31, 32 with minimum clearance.

The box structure 30 is pivotably mounted to the roller conveyor 22 by two hinges 40 which interconnect the box structure 30 and roller conveyor 22. The hinges 40 are mounted to the side wall surface 33 by conventional means adjacent the intersection line formed by the interconnection of the bottom wall surface 13 and cylindrical side wall surface 14. The top wall surface 32 includes a handle 42 attached thereon for facilitating manual grasping of the box structure 30 so that the box structure can be manually pivoted in a substantially circular path of travel around the hinges 40, allowing the top wall surface 32 of the box structure 30 to become the bottom wall surface and vice versa. As the receptacle is pivoted, the uranium dioxide powder contained within the receptacle 12 is shifted to obtain a more uniform bulk density of the powder contained therein.

As illustrated, the top wall surface 32 of the open ended box structure 30 includes an opening 45. Upon 180° pivoting of the box structure 30 and receptacle 12 contained therein, the box structure engages a stop 50 positioned adjacent and laterally to one side of the roller conveyor 22. The stop 50 is held adjacent the roller conveyor 22 by a bracket 51 and extension member 52 which is secured to the roller conveyor 22. The stop 50 prevents further pivoting motion of the box structure 30.

The stop 50 includes a conventional flat sodium iodide (NaI) crystal scintillator 53 which in a preferred embodiment is rounded and approximately two inches in diameter. The scintillator is secured to a conventional photomultiplier tube 54 held by the bracket 51. The photomultiplier tube 54 and crystal scintillator 53 mounted thereon, are positioned so that upon 180° pivoting of the open-ended box structure 30, the crystal scintillator 53 is aligned with the opening 45 in the top wall surface 32 of the box structure. In this position, the scintillator 53 engages the top cap 15 of the receptacle 12. A safety guard 55 formed from interconnecting sheet metal baffles extends across one side of the scintillator 53 and photomultiplier tube 54 to help protect the photomultiplier tube from damage.

Figure 3:
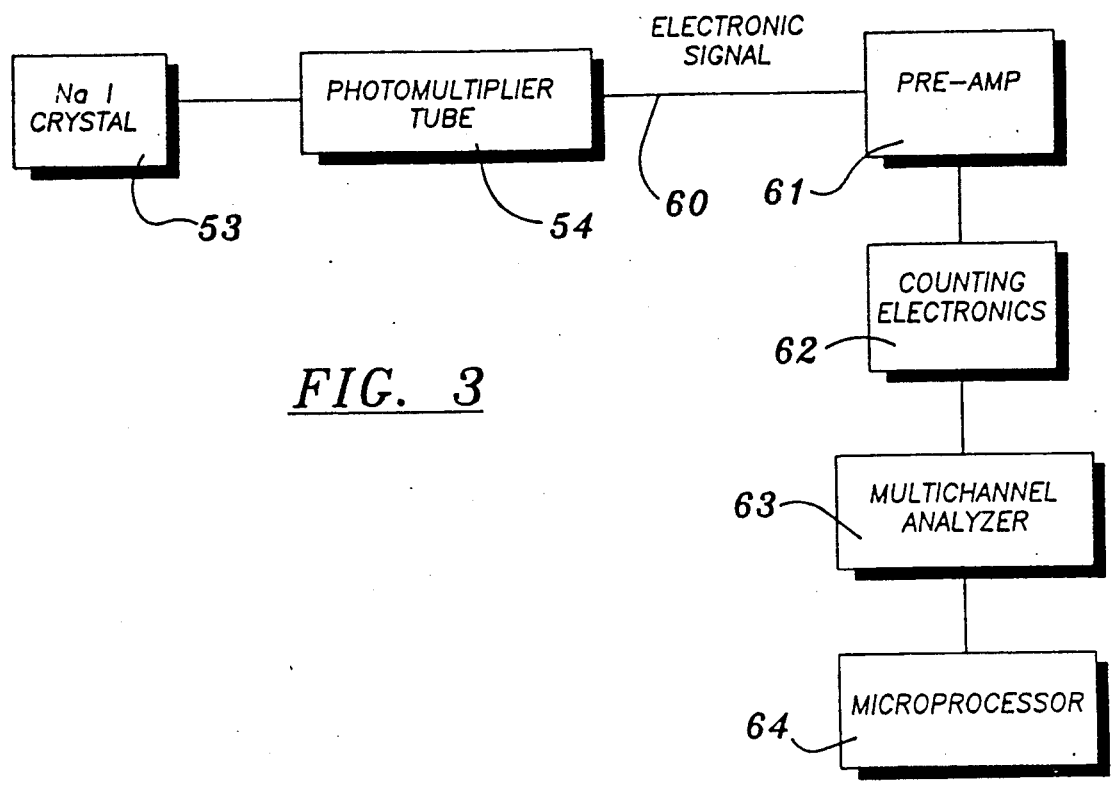
FIG. 3 is a block diagram illustrating basic components used in detecting the natural radiation emission count of the uranium dioxide powder and determining an enrichment value from that count.

As will be explained in more detail, the photomultiplier tube 54 is connected by coaxial cable 60 to a preamplifier 61 which amplifies the electronic signals generated by the crystal scintillator 53 corresponding to the emitted gamma radiation count (FIG. 3). The signals are then counted in conventional counting circuit 62. A multichannel analyzer 63 is adapted to analyze and separate various electronic signals corresponding to various gamma radiation energies, and the multichannel analyzer 63 connects to the microprocessor 64 which generates a spectrum of the 186 Kev gamma radiation energy level.

In actual operation, the apparatus 10 in accordance with the present invention is calibrated by two samples of uranium dioxide powder, the first having a known high enrichment and the second having a known low enrichment. A first receptacle having a uranium dioxide powder of relatively low enrichment, e.g. approximately 0.78 percent enrichment, is advanced along the roller conveyor 22 into the open-ended box structure 30. The box structure 30 is pivoted 180° so that the top wall surface 32 of the box structure becomes the bottom wall surface and vice versa. The cover cap 15 engages the stop 50 so that the crystal scintillator 53 engages the cover cap of the receptacle 12. During pivoting of the receptacle 12, the uranium dioxide powder contained within the receptacle is shifted therein, and as the powder shifts therein, a more uniform bulk density is obtained and any stratification of powder within the receptacle is diminished. The powder contained with the receptacle is self-shielding so that the majority of the gamma radiation emitted therefrom is absorbed by the powder itself. However, the powder adjacent the cover cap 15 and now resting thereon is not absorbed and the natural gamma radiation emitted from the powder adjacent the cover cap 15 is emitted onto the crystal scintillator 53.

As illustrated schematically in FIG. 3, as the natural gamma radiation contacts the crystal scintillator 53, light pulses or scintillations are generated which are captured by the photomultiplier tube 54. Conventional means in the photomultiplier tube 54 converts the light pulses to electronic signals which are amplified by the preamplifier 61. The electronic signals are counted in the conventional counting circuit 62 to give a total gamma radiation count. The multichannel analyzer 63 separates various radiation counts and in conjunction with the microprocessor 64 defines a spectrum of the preferred gamma radiation energies. The software in the microprocessor automatically generates a spectrum of the 186 Kev gamma radiation energy spectrum and similar to conventional pulse-height analyzers, measures the peak of the generated spectrum to determine the area of the generated peak. Thus, any background created by the fuel aging affect and chemical conversion of $U^{238}$ to the daughter $Pa^{234}$ nuclei is minimized.

Figure 4:
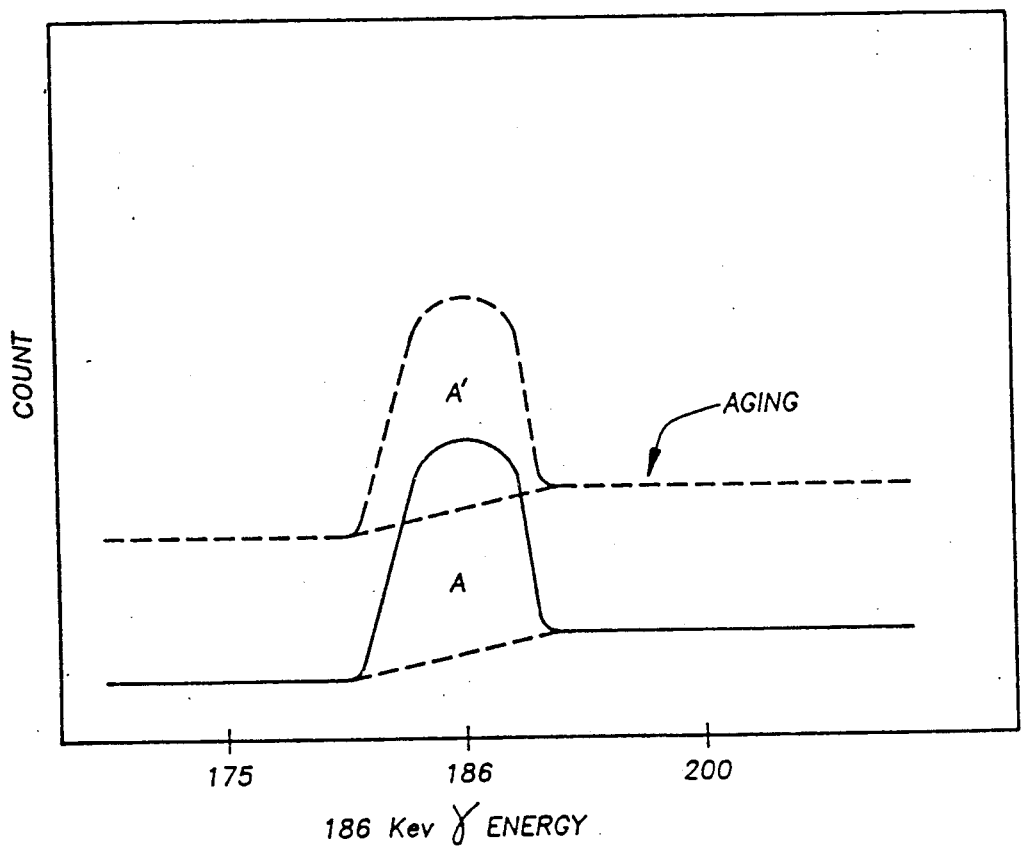
FIG. 4 is a graph of the 186 Kev gamma radiation naturally emitted from the $U^{235}$ isotope and showing the count difference generated by aging.

As shown in FIG. 4, uranium dioxide powder of various ages demonstrates a higher or lower spectrum depending on the age of the material. The fuel aging effect creates a higher radiation count which raises the spectrum curve accordingly. However, measurement of the generated peak of the 186 Kev spectrum is not dependent upon the fuel aging effect. The area of the generated peak of the 186 Kev gamma radiation energy spectrum does not substantially vary with fuel aging. As illustrated, the area A, corresponding to the generated peak of the 186 Kev gamma radiation emission spectrum for an unaged powder sample, is substantially equal to the area A1' corresponding to the generated peak of the 186 Kev gamma radiation emission spectrum for an aged powder sample. In contrast to some prior art methods where the area under the total curve which includes the 186 Kev gamma radiation energy was measured, the present invention is not affected by aging shifts in the spectrum curve because only the peak valve in the generated 186 Kev spectrum is measured. Measurement of the generated peak spectrum will give correct equal values.

When the peak of the generated spectrum of the known low enrichment uranium dioxide powder has been measured, the receptacle is removed from the open-ended relatively high enrichment, e.g. 3.8% enrichment, is advanced along the roller conveyor 22 into the openbox ended box structure. The process is repeated as before and the box structure 30 is pivoted to place the cover cap 15 of the receptacle 11 into contact with the crystal scintillator 53. The natural gamma radiation emission count is calculated and the 186 Kev spectrum generated. The peak of that generated spectrum is measured to determine the area corresponding to the high enrichment. The data for high and low enrichments is recorded in the microprocessor 64 and used as a reference for a powder having an unknown enrichment. The 186 Kev spectrum is generated for a powder of unknown enrichment and the peak of that generated spectrum is measured and compared with measurements obtained from uranium dioxide powder of known high and low enrichments to determine the relative enrichment of the unknown powder.

The foregoing embodiment is to be considered illustrative, rather than restrictive of the invention and the modifications which become within the meaning and range of equivalent of the claims are to be included therein.

That which is claimed is:

1. The method for determining the enrichment of stored uranium dioxide powder comprising the steps of
   providing a uranium dioxide powder of unknown fuel enrichment contained within a closed receptacle having top, side and bottom wall surfaces, said top surface being substantially flat, and a natural gamma radiation detector,
   turning the receptacle upside down along a substantially accurate path of travel so that the uranium dioxide powder is shifted within the receptacle to obtain a more uniform bulk density of the power contained therein, while also engaging the natural radiation detector with the substantially flat top after the receptacle has been turned upside down, and
   determining the degree of enrichment of the powder by detecting eh natural gamma radiation emission count emitted through the top surface by measuring the natural gamma radiation emission count and comparing said count to the emission counts of known enrichment blends.

2. The method as claimed in claim 1, including the step of calculating from the gamma radiation emission count of the powder the enrichment value of the powder.

3. The method as claimed in claim 1 including the step of generating a spectrum of the 186 Kev natural gamma radiation emission count and measuring the peak of that generated spectrum to determine the enrichment of the powder.

4. The method for determining the enrichment of stored uranium dioxide powder comprising the steps of
   providing a first uranium dioxide power of known relatively low fuel enrichment, providing a second uranium dioxide powder of known relatively high fuel enrichment, and providing a natural gamma radiation detector,
   placing each of the powders in a closed receptacle having top, side and bottom wall surfaces, said top surface being substantially flat,
   turning each of the receptacles upside down along an accurate path of travel so that the powder therein is shifted to obtain a more uniform bulk density thereof while also engaging the natural radiation detector with the substantially flat top after the receptacle has been turned upside down,
   determining the degree of enrichment by detecting the natural gamma radiation count emitted through the top surfaces of each of the first, second, and third powders while their receptacles are upside down, and
   comparing the defected natural gamma radiation emission count of the third powder with the detected natural gamma radiation emission counts of the first and second powders to obtain an enrichment value of the third powder.

5. An apparatus for determining the enrichment of uranium dioxide powder stored within a closed receptacle having a top, side and bottom wall surfaces, said top surface being substantially flat, comprising
   means for receiving the receptacle and for permitting the receptacle to be turned upside down along a fixed, statically accurate path of travel and so that euranium dioxide powder is shifted within said receptacle to obtain a more uniform bulk density of the powder contained therein, and means mounted at the end of said path of ravel for engaging the top surface of the receptacle and detecting therethrough the natural gamma radiation emission count of the powder after the receptacle is turned upside down by measuring the natural gamma radiation emission count and comparing said count to the emission counts of known enrichment blends.

6. The apparatus as claimed in claim 1 including micro processing means for calculating from the natural gamma radiation emission count of the powder the enrichment value of the powder.

7. An apparatus for determining the enrichment of stored uranium dioxide powder contained within a closed receptacle having top, bottom and side wall surfaces, said top surface being substantially flat comprising means for receiving the receptacle and for permitting the receptacle to be turned upside down along a fixed, substantially accurate path of travel and so that the uranium dioxide powder is shifted within said receptacle to obtain a more uniform bulk density of the powder contained therein, means mounted at the end of said path of travel for engaging the tops surface and detecting therethrough the natural gamma radiation emission count of the powder after the receptacle is turned upside down, and micro processing means operatively connected to said detecting means for generating a spectrum of the 186 Kev natural gamma radiation count and for measuring the peak of that generated spectrum to determine the enrichment of the powder by measuring the 186 Kev natural gamma radiation emission count and comparing the count to the emission counts of known enrichment blends.

8. The apparatus according to claim 7 wherein said detecting means is an NaI scintillator.

9. The apparatus according to claim 7 wherein said detecting means is positioned adjacent the bottom-most wall surface of said receptacle when said receptacle is turned upside down.

10. An apparatus for determining the enrichment of uranium dioxide powder contained within a closed receptacle having a top, bottom and side wall surfaces comprising roller conveyor means for advancing said receptacle along a linear path of travel, an open-ended box structure positioned along said path of travel to receive therein a receptacle advancing along said roller conveyor means, said box structure having a bottom wall surface resting on said conveyor means, a top wall surface and two opposing side wall surfaces connecting top and bottom wall surfaces so that the open ends of said box structure form an opening along said path of travel to receive a receptacle therein, hinge means interconnecting said box structure and aid roller conveyor means for permitting said box structure to be pivoted in a substantially circular path of travel around said hinge means so that the top wall surface of said box structure becomes the bottom wall surface and vice versa wherein upon pivoting of the receptacle the uranium dioxide powder contained within the receptacle is shifted within said receptacle to obtain a more uniform bulk density of the powder contained therein, stop means positioned adjacent said roller conveyor means and adapted for engaging the bottom wall surface of said receptacle after said box structure is pivoted about the hinge means and preventing surfacer pivoting motion of said ox structure, said stop means also including scintillation means for detecting the natural radiation emission count of the powder, and micro processing means operatively connected to said scintillation means for generating a spectrum of the 186 Kev natural radiation count and for measuring the peak of that generated spectrum to determine the enrichment of the powder.

* * * * *